Figure 1:
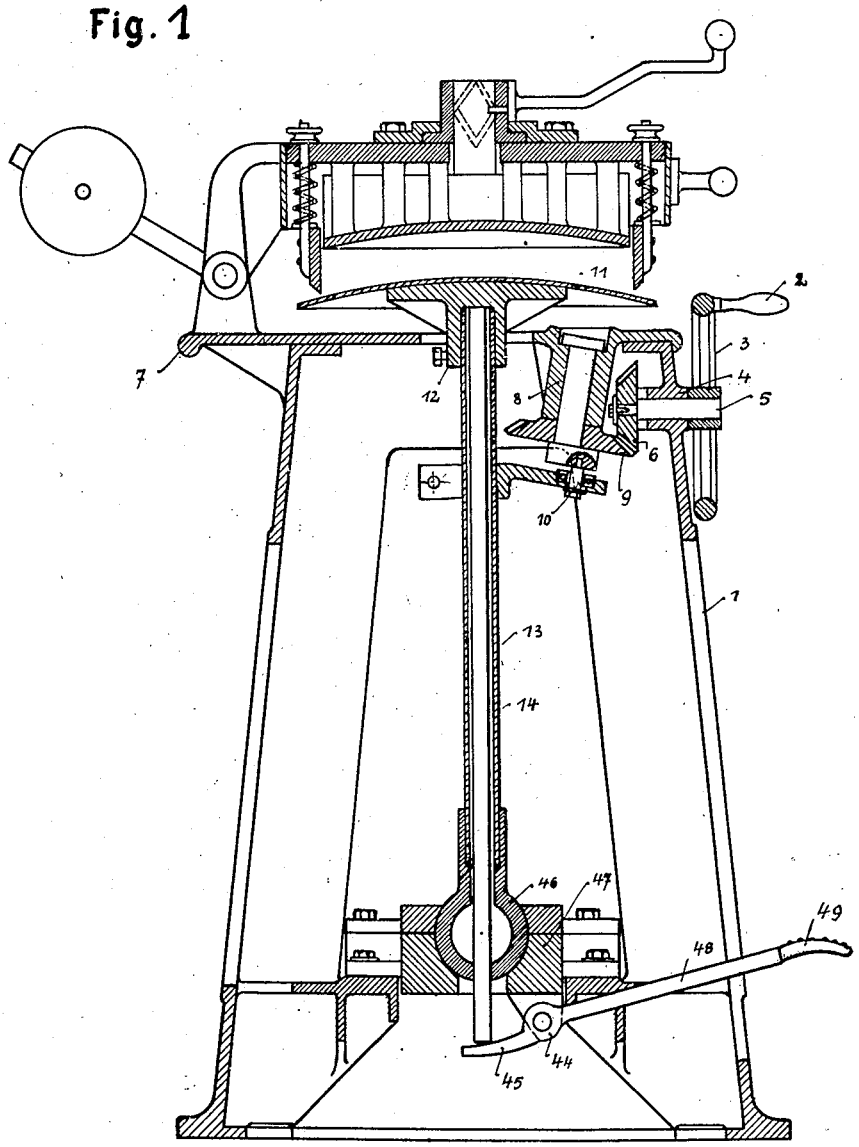

March 10, 1931. K. H. HOFFMANN 1,796,102
DOUGH DIVIDING AND MOLDING MACHINE
Filed July 16, 1929 5 Sheets-Sheet 1

Inventors:-
Karl Hildmar Hoffmann
by
Langner, Parry, Card & Langner
Attys.

March 10, 1931.  K. H. HOFFMANN  1,796,102
DOUGH DIVIDING AND MOLDING MACHINE
Filed July 16, 1929  5 Sheets-Sheet 2
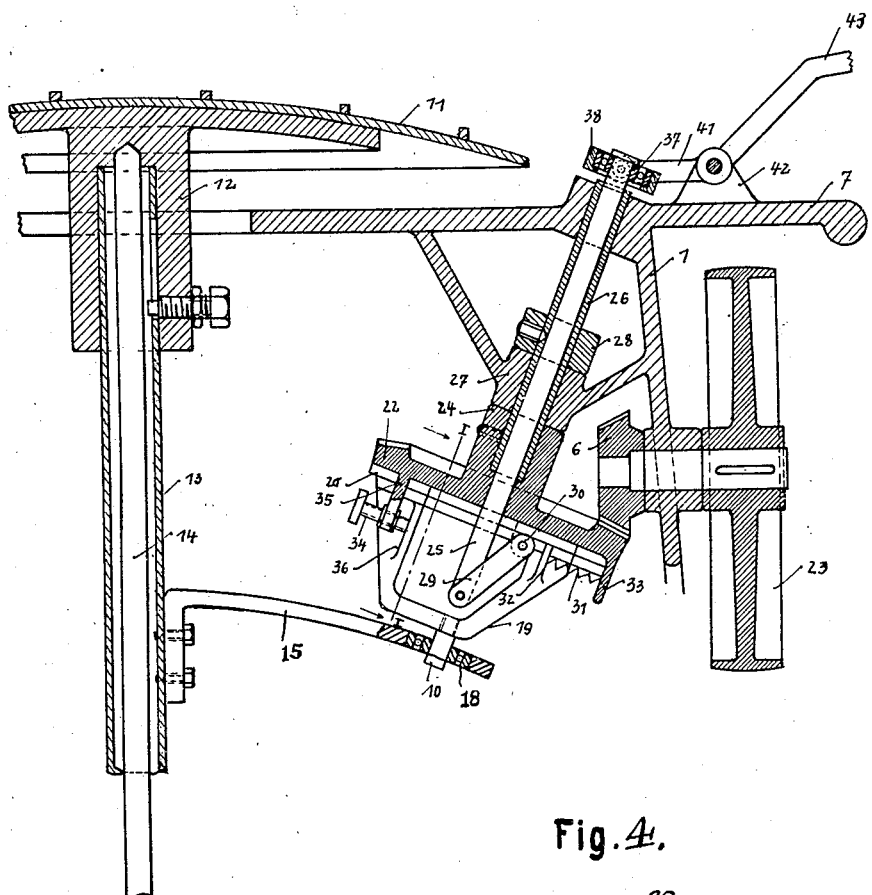
Fig. 2.
Fig. 4.
Fig. 3.
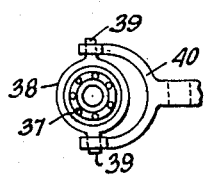
Inventors:-
Karl Heldmar Hoffmann
by
Langner, Parry, Card & Langner
Attys.

March 10, 1931. K. H. HOFFMANN 1,796,102
DOUGH DIVIDING AND MOLDING MACHINE
Filed July 16, 1929 5 Sheets-Sheet 3

Inventors:-
Karl Hildmar Hoffmann
Langner, Parry, Card & Langner
Attys.

March 10, 1931.  K. H. HOFFMANN  1,796,102
DOUGH DIVIDING AND MOLDING MACHINE
Filed July 16, 1929  5 Sheets-Sheet 5

Inventors:-
Karl Hildmar Hoffmann
by
Lanpur, Parry, Card & Lanpur
Attys.

Patented Mar. 10, 1931

1,796,102

UNITED STATES PATENT OFFICE

KARL HILDMAR HOFFMANN, OF BEUDITZ, GERMANY

DOUGH DIVIDING AND MOLDING MACHINE

Application filed July 16, 1929, Serial No. 378,746, and in Germany July 15, 1927.

This invention relates to dough dividing and molding machines and more particularly to machines of this kind which are equipped with a dividing device of the form of a star-shaped system of knives and a molding plate together with a supporting member which is mounted within a universal or Cardan joint provided at the frame of the machine, said plate having a working surface which is curved spherically around the center of said joint. In a machine of the aforedescribed kind the molding plate may be immediately driven by hand which, however, is undesirable for various reasons.

According to my invention the drive for the molding plate of a dough dividing and molding machine now is improved in the first place by fixing an arm to the supporting member for said working plate, said arm forming the connecting rod of a crank-drive which is mounted upon the frame or casing of the machine, said crank-drive forming the driving mechanism proper for said molding plate. This crank-drive according to my invention may now be operated by hand or driven by means of a motor. According to my invention a ball-bearing is further provided intermediate the free end of the aforementioned arm and the crank-drive and the crank-pin of said drive is mounted in said ball-bearing. Said crank-pin according to my invention is further made adjustable to permit variation of the length of the crank-arm and therewith the width of the oscillating motion of the supporting member for the molding plate during the operation of molding the dough. By this there will be attained the possibility of gradually increasing the working stroke of the molding plate between zero and a maximum value, that is to say to give for instance the curve of working motion the form of a spiral. Furthermore, by arranging the drive for the molding plate according to my invention it will further be possible to conveniently put the molding plate into and out of operation to keep the drive for the molding plate continuously in operation and to vary the working stroke of the molding plate by the aid of a single lever. In a dough dividing and molding machine constructed according to my invention it is therefore no more necessary to provide special means for throwing-in and out the driving pulley or for making and breaking the electrical circuit of the motor. Furthermore the variation of the stroke of the molding plate according to my invention may be controlled either automatically or by hand.

According to my invention the crank-pin forming part of the drive for the molding plate is preferably fixed to a slide which is adjustably mounted on a bevel-gear to permit adjustment of said slide parallel to the plane of said bevel-gear, the latter being continuously rotated by means of said drive. This slide, more particularly, may be so adjusted that the eccentricity of the crank-pin will at first be equal to zero, thus rendering ineffective the working motion of the molding plate when so adjusting said crank-pin.

In known constructions of machines of the present kind the molding plate is mounted displaceably on its supporting member with respect to a fixed counter-plate which serves for guiding the dividing knives, this being done for the purpose of exerting the required pressure upon the dough. According to my invention the hand-lever which in known construction of dough dividing and molding machines serves for displacing the molding plate from the outside of the machine is made adjustable according to my invention. By this it will be possible to adjust the height of the molding motion in accordance with the weight of the dough at a time worked upon by the machine. More particularly, the height of the molding motion may be adjusted by adjusting the initial position of the molding plate in accordance with the desired pressing and molding motion. A stop is used for this purpose, said stop being mounted on the rear part of the upper cover-plate of the machine casing and adapted to limit the stroke of said hand-lever. The said stop consists of a slide-member guided by a fixed bolt which extends into a slot in said slide-member. More particularly, the stroke of said hand-lever is limited by said stop, inasmuch as the latter determines the extent of backward motion of said hand-lever.

In order to bring about axial displacement of the molding plate by means of said hand-lever, it will be necessary that the supporting member for said plate is positively connected with said lever. On the other hand said supporting member must be arranged to permit a gyratory molding motion of the molding plate. Accordingly, said hand-lever according to my invention is constructed as a double-armed lever, the supporting member for the said plate being mounted upon the shorter arm of said lever. Intermediate the supporting member for the molding plate and the hand-lever there is interposed a ball permitting free motion of said supporting member, said ball serving for the purpose of reducing the friction which arises during the operation of molding.

In order to further reduce said friction to a minimum, the ring which surrounds the dough is mounted displaceably within the head of the machine upon the counter-pressure plate by means of spindles, said counter-pressure plate acting as an abutment for the dough during the operation of pressing and molding. In this manner the molding plate may move freely underneath said ring which surrounds the dough, while the counter-pressure plate itself is being kept immovably in space. This is accomplished according to my invention by fixing the head—which carries the star-shaped system of knives as well as the counter-pressure plate during the operation of dividing and molding the dough—to the machine-casing and therewith locking it with the molding plate. For this purpose a locking device is provided on said head. By this it will be rendered possible to construct the head to form a part of the under casing of the machine or, as the case may be, an extension or continuation of said under casing. By means of this construction now the distance between the ring-shaped member which surrounds the dough and the molding plate may be properly adjusted with full certainty.

The aforementioned locking of the head is preferably effected by means of a resilient bolt engaging with the aforementioned locking device, said bolt being adapted to be unlocked by means of a special contrivance provided at the lever which serves for swinging said head. Manipulation of the machine will thus be rendered as simple as possible, and solely with the aid of one hand and from a single place of the machine.

A further modified form of the machine according to my invention is arrived at by providing a downwardly directed extension at the head of the machine, said extension being mounted at the hinge of said head and coupled with a balance weight lever fulcrumed to the upper part of the machine-casing on the inside or outside thereof. The mode of coupling said extension to said lever may be carried out in various manners. Also, instead of a balance weight lever a plain hand-lever may be used for properly balancing the head of the machine.

By mounting the balance weight lever on the upper part of the machine-casing there will be in the first place the advantage that no weighted parts will project out of the machine thus improving still further the construction of the machine with respect to being closed all around. There will further be given the possibility to mount the driving motor for the molding plate in the under parts of the machine-casing, this resulting in a motor driven dough dividing and molding machine of fully closed construction. Since in the present case the axles of the machine are positioned at very small distances from each other, according to my invention there is provided a tension-roller mounted at the free end of the one arm of the double-armed lever fulcrumed to the machine-casing. The other arm of said lever carries at its free end a brake-shoe, which upon releasing said tension-roller engages with the driven pulley, thus tensioning the belt when releasing the brake and vice versa. This double-armed lever may further be equipped with an extension fixed to a lever which may be actuated by hand or by means of a treadle or the like to put the machine into and out of operation.

The present dough-dividing and molding machine may further be improved according to my invention by constructing the Cardan joint which is associated with the supporting rod of the molding plate only with two bearing pins which are positioned rectangularly to each other, the pin which serves for the reception of said supporting rod being mounted within an eye forming a connection with said other pin which is mounted in the machine-casing.

A further feature of my present invention consists in properly constructing the machine to protect the molding plate against dust, this being accomplished by the aid of a flexible tube or the like interposed between said molding plate and the machine-casing.

Figure 5:
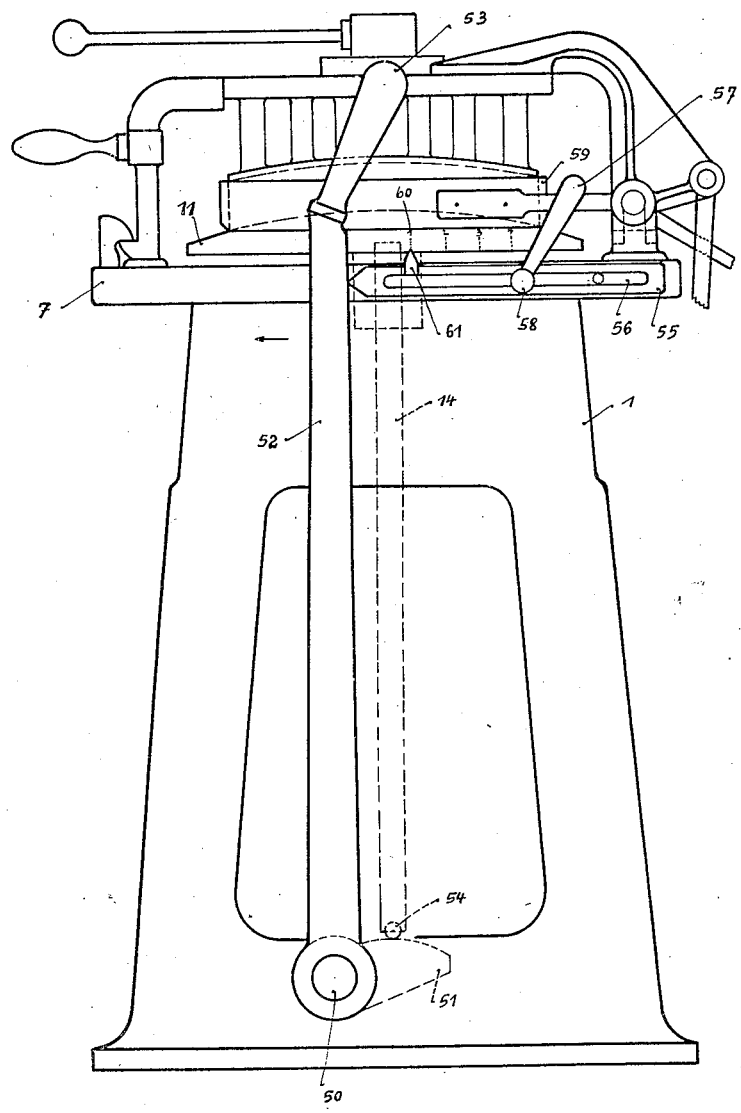

In the accompanying drawings I have shown a number of constructions embodying the novel features of my invention. Fig. 1 is a longitudinal vertical section through a dough-dividing and molding machine constructed according to my invention, Fig. 2 a longitudinal section through the upper part of a modification of the machine according to Fig. 1, Fig. 3 a detail section along line I—I of Fig. 2 as seen in the direction of the arrows in Fig. 2, Fig. 4 a top-view of a part of the construction according to Fig. 2. Fig. 5 a full side-view of the machine, Fig. 6 a longitudinal section through a further modified form of a dough-dividing and molding machine according to my invention, Fig. 7 a cross-section through the bearing for the supporting rod forming part of the machine, said cross-section being taken along line II—II of Fig. 4, and Figs. 8 and 9 broken-away side-views of the upper part of two further modified forms of a dough dividing and molding machine according to my invention.

The construction shown in Fig. 1 comprises a driving wheel 3 mounted in a bearing 4 on the machine-casing 1, said driving wheel 3 being equipped with a handle 2. The shaft 5 of said wheel 3 carries at its inner end a bevel-gear 6 which meshes with a second bevel-gear 9 mounted in a bearing 8 on the upper cover-plate 7 of the machine-casing, said latter bevel-gear imparting rotary motion to a crank-pin 10.

As may be seen more clearly from Fig. 2, the molding plate 11 is mounted upon a carrier 12 and supported by a bearing sleeve 13 and a rod 14 mounted within said sleeve 13 to permit axial motion of said rod within said sleeve. The rod 14 is further mounted to permit rotation thereof within the carrier 12 in such a way that the latter may be slidingly moved with respect to said sleeve 13.

An arm 15 is fixed upon the sleeve 13 which acts as the support proper for the molding plate 11, said arm 15 carrying at its free end a ball-bearing 18 serving for the reception of the crank-pin 10. The latter, as shown in Fig. 2, is fixed to a clip 19 which at its upper part is formed as a slide 20 and engages by means of a dovetail with the under surface 21 of the bevel-gear 22 permitting sliding of the clip 19 upon said surface 21. The bevel-gear 22, as shown in Fig. 2, meshes with a second bevel-gear 6, mounted on a shaft which carries at its outer end a pulley 23 for driving the machine by means of a motor.

A rod 25 extends in axial direction through the hub 24 of the bevel-gear 22, said rod being guided within a sleeve 26 projecting into the bore of said hub 24. The sleeve 26 rotates together with the bevel-gear 22 and is mounted within a bearing 27 integral with the machine-casing 1. An adjusting ring 28 is fixed upon the sleeve 26 and adapted to form an abutment for the bearing 27 to permit fixing of the bevel-gear 22 relatively to the casing 1.

The rod 25 is pivoted at its under end to a forked lever 29 which at its upper end is pivoted to the clip 19 to cause the latter upon downward motion of the rod 25 to slide upon the under surface of the bevel-gear 22 against the action of a spring 31 which engages on the one hand with the clip 19 at 32 and on the other hand with the body of the bevel-gear 22 at 33. The spring 31 therefore will press the clip 19 against the adjusting screw 34 by the aid of the slide 20—21, said adjusting screw being mounted upon a lug 35 projecting from the body of the bevel-gear 22 and co-operating with a surface 36 on the clip 19.

The rod 25 consequently will participate in the rotation of the bevel-gear 22 together with the clip 19. The rod 25, moreover, is rotatably mounted at its upper end within a ball-bearing 37, the outer ring 38 of said ball-bearing being swingably supported by means of two pins within a fork 40 as shown in Fig. 4. The fork 40 forms the end of one arm of a bell-crank or double-armed lever 41 fulcrumed at 42 upon the cover-plate 7 forming part of the machine-casing, while the other arm 43 of said bell-crank or double-armed lever 41 may be actuated by hand. By means of the double-armed lever 41—43, therefore, the rod 25 may be displaced in upward and downward direction within the sleeve 26.

This motion of said rod 25 permits variation of the eccentricity of the pin 10 due to displacement of the clip 19 and in addition to this, variation of the diameter of the conical surface described by the supporting member 13 while being moved by the arm 15. In this manner the stroke of the molding mechanism may be varied, for instance in such a manner that said mechanism during the operation of molding may be caused to move along a spiral.

In the condition of the machine as shown in the drawing this eccentricity is equal to zero. The molding plate in consequence thereof will be kept fully at rest in spite of the fact that the driving mechanism is constantly in operation and may be put into and out of operation by means of the lever 41—43.

In the construction shown in Fig. 1 axial motion of the supporting rod 14 relatively to the sleeve 13 is effected by means of a double-armed lever 45—48 which is fulcrumed at 44 to the under part of the machine-casing 1. the shorter arm 45 of said lever supports the rod 14, while the sleeve 13 rests by means of the ball-shaped member 46 within the body 47 mounted on the under part of the machine-casing 1. The longer arm 48 of said lever terminates into a treadle 49 which serves for raising and lowering the molding plate 11 by the foot of the operator.

According to Fig. 5 motion of the rod 14 is effected by a hand-lever which is fulcrumed to the machine-casing 1 on the outside thereof as shown at 50. The operation of pressing the dough may be effected by swinging the lever 52 in the direction shown by the arrow, the upper surface of the cam-shaped arm being properly 51 arched so that during swinging the lever 52 the rod 14 may be moved upward together with the molding plate 11. Intermediate the under end of the rod 14 and the cam-shaped arm 51 there is interposed a ball 54 permitting a certain play of the rod 14 and reducing friction to a minimum during the operation of molding. In order to limit the stroke of the lever 52 for properly fixing the initial position of said lever to determine the height of the molding motion, a slide 55 is mounted laterally on the working table 7 of the machine-casing 1, said slide 55 being provided with a longitudinal slot and a clamping-bolt 58 with a handle 57 thereon, said bolt passing through said slot to permit the slide 55 to be displaced and fixed within said slot. The slide 55 may thus be adjusted within limits determined by the length of the slot of the guide-mechanism 56 along the lateral track of the working table 7 and fixed upon the latter. Adjustment of said slide may be accomplished independently from the temporary adjustment of the height of working motion of the molding plate, said height again depending upon the motion which may be required for a given weight of the dough at a time worked by the machine. Moreover, adjustment of said slide on the movable ring 59 which surrounds the dough may be read off by means of a graduation. This graduation, however, may also be provided at 60 on the cover-plate 7, a pointer 61 moving along said cover-plate which pointer is fixed upon said slide 55.

Before operating the machine the slide 55, in case said graduation is provided on said slide, is adjusted upon the proper dash of the graduation 60 and thereupon fixed in this position. Prior to the operation of pressing the dough the lever 52 is moved to such an extent until it abuts against said slide 55 which renders further displacement impossible and at the same time determines the initial position for the molding plate 11. The farther the slide-member 55 is positioned towards the rear, the more the molding plate will be lowered to increase the height of the molding motion. The operation of pressing may be brought about by swinging the lever towards the front in the direction of the arrow, shown in Fig. 5.

The knives 62 which form part of the star-shaped dividing device freely pass in well-known manner through the counter-pressure plate 63 which forms the upper closure for the pressing space. The pressure plate in the present case is fixedly arranged and immediately connected with the remaining parts of the head 64. The knives 62 now move within the ring-shaped member 59 which constitutes the outer wall of the dough receptacle. The ring 59 is slidably mounted upon a plurality of bolts 65 fixed on the head 64, permitting displacement of said ring with respect to the press-plate 63 against the action of springs 66. The bolts 65 may be adjusted by means of adjusting nuts 67 threaded onto the upper ends of said bolts. Simultaneously with the adjustment of the bolts 65 also the distance of the ring 59 from the counter-pressure plate 63 as well as from the molding plate 11 may be fixed, said ring being just out of engagement with the plate 11 during the operation of molding. During the operation of pressing, that is during upward motion of the molding plate 11, however, the ring 59 is permitted to move upward to avoid interference with the operation of pressing.

The head 64 may be swung upward around a hinge 68 and is provided with a closing member 69 opposite to said hinge, said closing member 69 engaging with an elevation 70 on the upper cover-plate 7 of the machine-casing 1 permitting to securely fix the counter-pressure plate 63 with respect to the machine-casing. The closing member 69 is provided with a handle 71 projecting from said closing member towards the front, a bell-crank being fulcrumed to said closing member below said handle at the point 72, one arm 73 of said bell-crank being adjacent to said handle, while the other arm 74 of said bell-crank engages with the pawl of a locking-lever 75 fulcrumed at 76 to the machine-casing 1 and adapted to swing towards the outside against the action of a spring 77. The spring 77 exerts a pressure upon a stop 78 which projects from the locking lever 75 at an angle thereto. Upon upward motion of the arm 73 of the bell-crank, therefore, the pawl of the lever 75 will be moved towards the front thus disengaging the closing member 69 so that the head 64 may be swung upward. In the opposite way the machine may be closed up by said head automatically by a mere downward swinging of said head.

Figure 6:
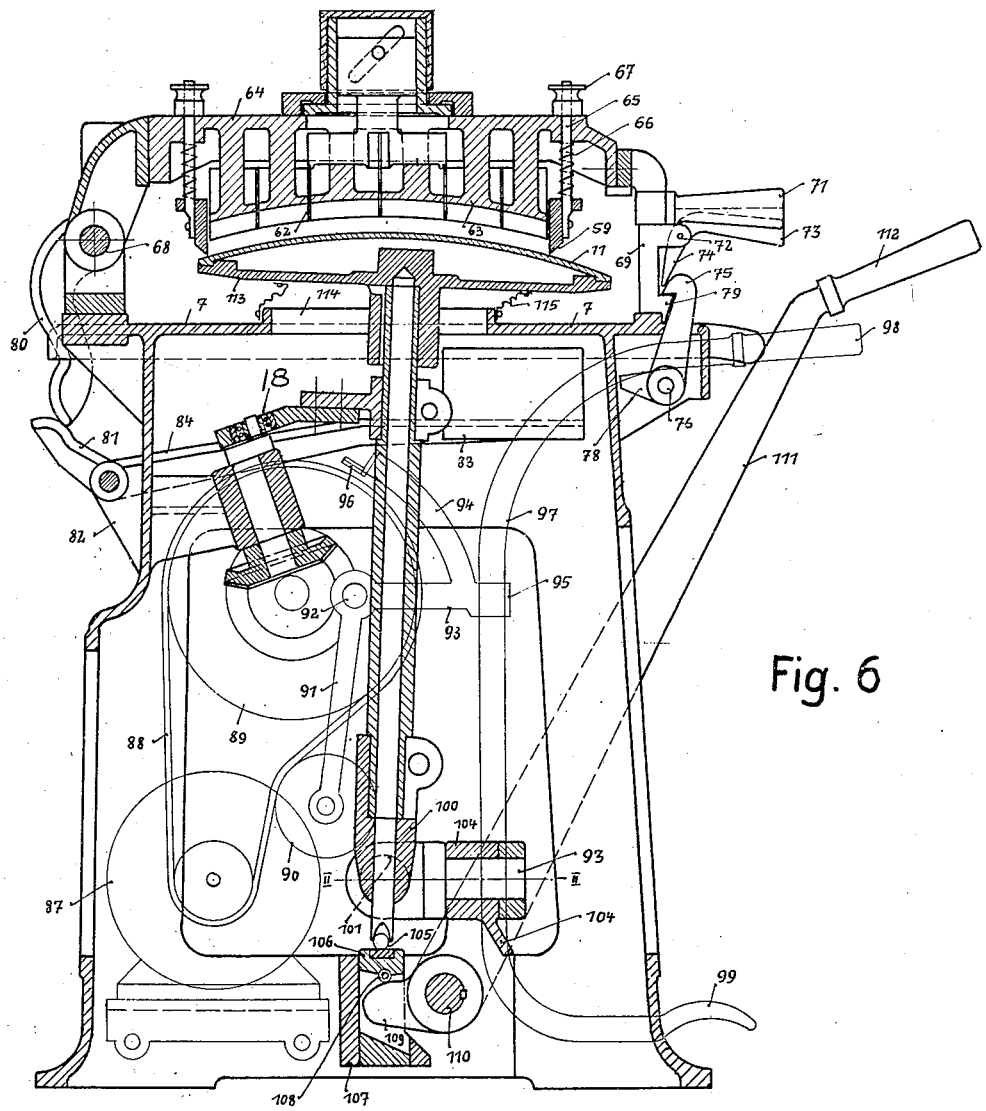
Figure 7:
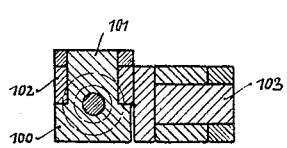

The head 64 according to Fig. 6 is further provided with an extension 80 projecting towards below out of the hinge 68, said extension engaging with the shorter arm 81 of a double-armed lever fulcrumed to a lug 82 on the machine-casing 1, while the longer arm 84 of said lever carries at its outer end a weight 83 which is positioned in the interior of the machine-casing 1. The arm 84 is eventually properly forked around the interior parts of the driving mechanism for the molding plate 11. The arm 81 is permanently pressed by action of the weight 83 against the extension 80, so that the weight of the head 64 will be properly counter-acted by said weight 83 while being opened.

Figure 8:
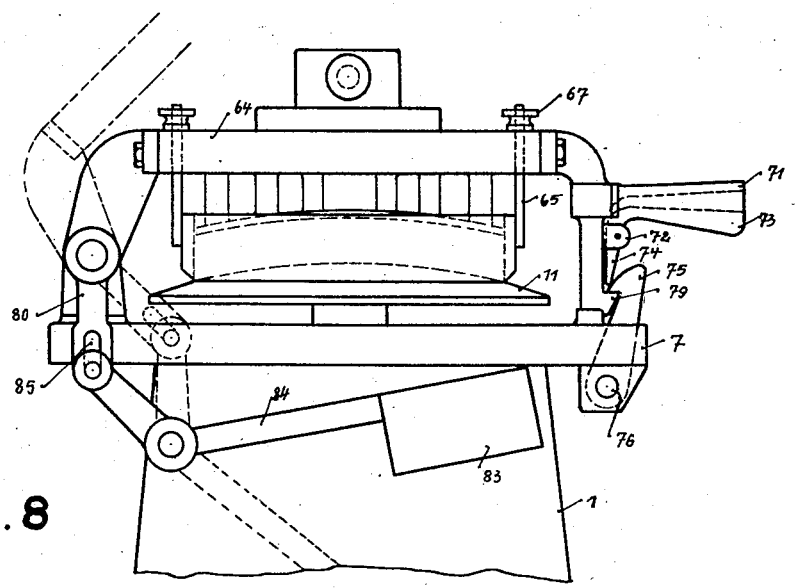

According to Fig. 8 the head 64 is likewise provided with a downwardly directed extension 80 which participates in the swinging motion of said head, the same as in the construction represented in Fig. 6. The extension 80 according to Fig. 8, however, is provided at its under end with a slot 85 pivotally connected to the lever 84 which carries the weight 83, said lever 84 being likewise constructed at a double-armed lever.

Figure 9:
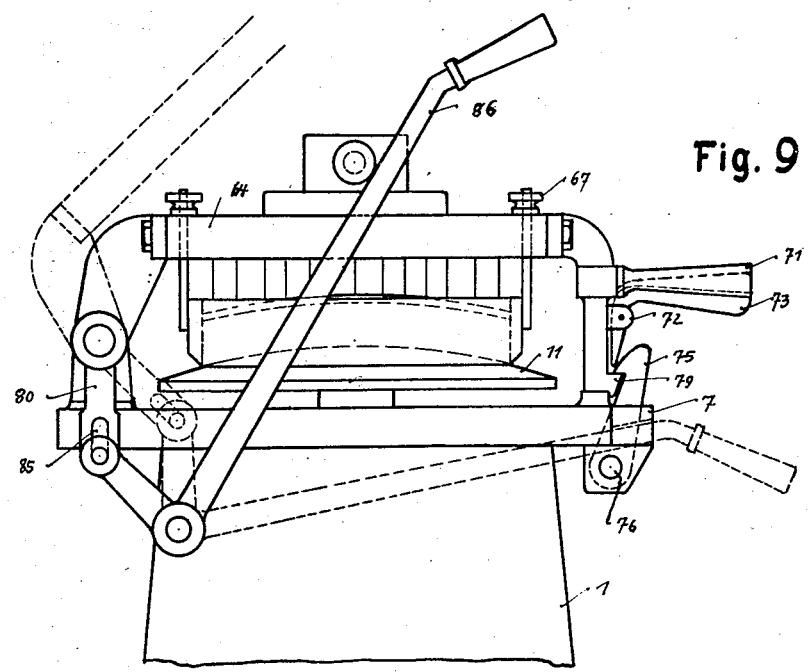

In the construction shown in Fig. 9 a hand-lever 86 is used instead of the weighted arm 84, said hand-lever 86 when depressed causing the head 64 to be raised, as indicated in dotted lines in Fig. 9. During raising the head upon depression of the lever 86 the motion of the head may thus be greatly facilitated. In like manner, during closing the head 64 which is effected by raising the lever 86 from the dotted into the full-drawn position, the closing motion of said head may be properly counter-acted.

The space which is gained in the interior of the machine-casing by placing the lever 84 within the upper part of said casing as shown in Fig. 9 now is utilized to advantage for mounting the driving motor within the under part of the machine-casing. According to Fig. 6 the driving motor 87 imparts rotation to the pulley 89 by means of a belt 88, said belt 88 being carried past a tension roller 90 mounted upon the free end of a lever 91 which forms one arm of a bell-crank fulcrumed at 92 to the machine-casing. The other arm 93 of said bell-crank is equipped with an upwardly directed arcuated extension 94 and a further laterally directed extension 95. Said first mentioned arcuated extension 96 is provided at its free end with a brake-shoe 96, while said latter extension 95 is fixed to a rod 97, the upper and under ends of said rod being carried to the outside of the machine to form a handle 98 or a treadle 99 or the like as indicated in dotted lines in Fig. 6. The bell-crank 91, 93 may now be operated either by the hand or the foot of the operator in such a manner that either the tension-roller 90 or the brake-shoe 96 will come into action. Evidently, also only one half of the rod 97 may be used to operate the bell-crank 91, 93 either by a handle or by a treadle. In order to start the machine, the tension-roller 90 is actuated, while stopping may be effected by rendering the tension-roller inoperative by moving the same away from the belt 88. Apparently the brake-shoe 96 will be caused to come positively into operation when releasing the tension-roller. The motor as well as the parts appertaining thereto are represented in Fig. 6 in dash-dotted lines.

The sleeve 13 which surrounds the supporting rod 14 for the molding plate 11 is equipped at its under end with a shoe 100 which serves as a bearing member for said sleeve 13 and therewith also for the molding plate 11. The shoe 100 for this purpose is equipped with a transverse stud 101 which is mounted within a second bearing body 102 as more clearly shown in Fig. 7. The bearing body 102 is provided with a stud 103 positioned normally to the stud 101, said stud 103 being mounted within a bearing 104 fast on the machine-casing 1. In this manner a Cardan joint will be provided which, however, includes only two bearing pins in the form of said studs 101 and 103.

The rod 14 rests upon a slide 106, a ball 105 being interposed therebetween. The slide 106 is mounted displaceably in vertical direction within a guide 107 fixed to the casing 1 and resting upon the cam-shaped arm 109 of a double-armed lever or bell-crank 109—111, a further ball 108, being interposed between said slide 106 and said cam-shaped arm 109. The double-armed lever composed of said arm 109 and the actuating lever 111 is fulcrumed at 110 to the casing 1. The actuating lever or longer arm 111 of said double-armed lever or bell-crank terminates in well-known manner into a handle 112 by means of which the molding plate 11 may be displaced in axial direction.

Due to the afore-described use of ball-bearings or the like, the molding plate 11 may be moved during the operation of molding in a manner which offers only a minimum of friction. The molding plate proper 11 is mounted upon a further plate or support 113 and intermediate this latter plate and the rim of the aperture 114 in the cover-plate 7 there is mounted a short flexible tube 115 which serves as a protection against intrusion of dust or the like into the interior of the machine-casing.

I claim:

1. A dough dividing and molding machine, comprising in combination, a casing, a molding plate having a spherical working surface, a supporting member for said working plate, a universal joint positioned at the center of the arc of said spherical working surface, an arm secured to said supporting member, a spherical ball-bearing race carried by said arm, a crank-pin carried by said ball-bearing race, means for driving said crank-pin, means for eccentrically adjusting said crank-pin to vary the amplitude of the motion of the supporting member and the molding plate carried thereby, said means for eccentrically adjusting said crank-pin including a slide associated with said crank-pin, and a gear forming a part of the crank-pin driving mechanism having a groove therein in which said slide can slide in order to permit a sliding motion parallel to the plane of said gear.

2. A dough dividing and molding machine comprising in combination, a casing, a molding plate having a spherical working surface, a supporting member for said molding plate, a universal joint positioned at the center of the arc of said spherical working surface, an arm secured to said supporting member, a ball-bearing race mounted in said arm, a crank-pin carried by said ball-bearing race, means for driving said crank-pin, means for eccentrically adjusting said crank-pin to vary the amplitude of the motion of said supporting member and the molding plate carried thereby, said means for eccentrically adjusting said crank-pin including a slide connected to said crank-pin, a bevel gear forming a part of the driving means for said crank-pin having a groove in which said slide is adapted to reciprocate in a direction parallel to the plane of said bevel gear, an adjusting rod extending axially through said bevel gear, said adjusting rod extending to the outside of the machine and being connected to said slide so as to permit of a displacement of said slide in said groove, and resilient means cooperating with said slide and adapted to counteract the displacement of said slide caused by said adjusting rod.

3. A dough dividing and molding machine comprising in combination, a casing, a molding plate having a spherical working surface, a supporting member for said molding plate, a universal joint positioned at the center of the arc of said spherical working surface, an arm secured to said supporting member, a crank-pin universally connected to said arm, means for driving said crank-pin and means for varying the eccentricity of said crank-pin with relation to the axis of movement of said crank-pin between zero and a maximum value in order to vary the amplitude of the movement of said molding plate between zero and a maximum value whereby the molding motion of the molding plate can be placed in or out of operation.

4. A dough dividing and molding machine comprising in combination, a casing, a molding plate having a spherical working surface, a supporting member for said molding plate, a universal joint positioned at the center of the arc of said spherical working surface, a counter-pressure plate cooperative with said molding plate during the operation of molding, said counter-pressure plate being displaceably mounted upon said casing in order to permit the pressing of the dough intermediate said two plates, means for oscillating said molding plate, means for varying the amplitude of the oscillations of said molding plate, a lever connected to said supporting member for moving said supporting member and molding plate axially and a stop associated with said lever to limit the motion of said lever and thereby the axial movement of said molding plate.

5. A dough dividing and molding machine comprising in combination, a casing, a molding plate having a spherical working surface, a supporting member for said molding plate, a universal joint positioned at the center of the arc of said spherical working surface, a counter-pressure plate designed to cooperate with said molding plate during the operation of molding, said counter-pressure plate being displaceably mounted on said casing in order to permit of pressing the dough placed intermediate said plates, means for oscillating said molding plate, means for varying the amplitude of the oscillations of said molding plate, a double arm lever fulcrumed to said casing to move said molding plate axially, said molding plate being supported by the shorter arm of said double arm lever, and an anti-friction ball-bearing interposed between said molding plate and said shorter arm.

6. A dough dividing and molding machine comprising in combination, a casing, a molding plate having a spherical working surface, a supporting member for said working plate, a universal joint positioned at the center of the arc of said spherical working surface, an actuating lever cooperating with said supporting member to vary the molding height of said molding plate, a stop cooperating with said lever, said stop consisting of a slide block movably mounted within a slot and pin guide, and a clamping lever for fixing said slide block within said slot and pin guide.

7. A dough dividing and molding machine comprising in combination, a casing, a molding plate having a spherical working surface, a supporting member for said working plate, a universal joint positioned at the center of the arc of said spherical working surface, a counter-pressure plate cooperating with said molding plate during the molding operation, said counter-pressure plate being displaceably mounted on said casing to permit of the pressing of the dough intermediate said two plates, means for oscillating said molding plate, means for varying the amplitude of the oscillations of said molding plate, a lever adapted to move said molding plate axially, a stop associated with said lever to limit the movement of said lever and thereby the axial movement of said molding plate, a ring-shaped member cooperating with said counter-pressure plate and molding plate to form a receptacle for the dough during the molding operation, spindles mounted adjustably in said counter-pressure plate carrying said ring-shaped member, said spindles permitting a free axial movement of said molding plate underneath said ring-shaped member and the free oscillation of said molding plate during the molding operation.

In testimony whereof I have signed my name to this specification.

KARL HILDMAR HOFFMANN.